Feb. 6, 1934.   G. E. THOMAS   1,946,368
FOLDABLE LUGGAGE CARRIER
Filed Feb. 29, 1932   2 Sheets-Sheet 1

G. E. Thomas, INVENTOR
BY Victor J. Evans & Co.
ATTORNEY

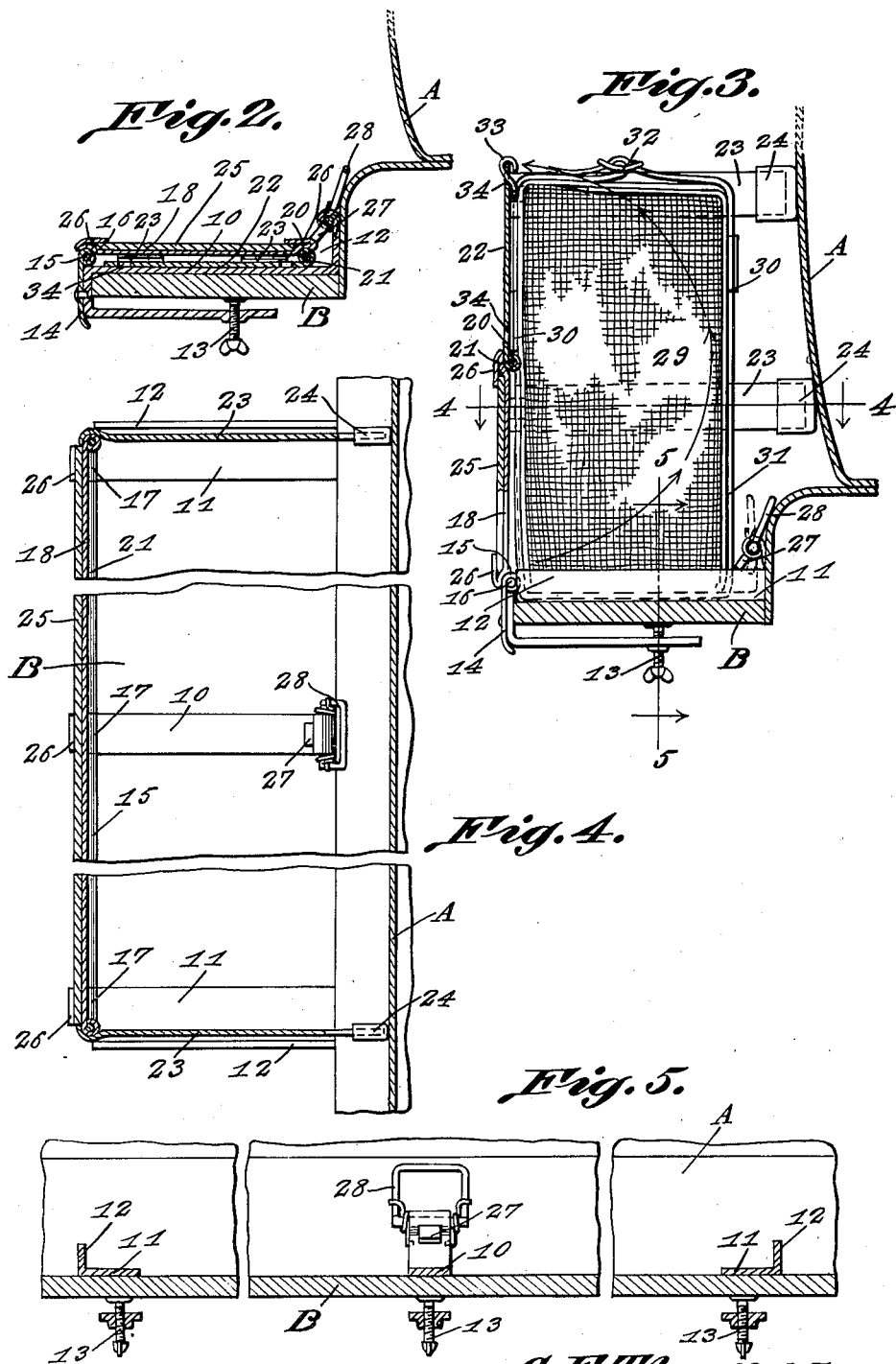

Patented Feb. 6, 1934

1,946,368

UNITED STATES PATENT OFFICE 1,946,368

FOLDABLE LUGGAGE CARRIER

Gershom E. Thomas, Germantown, Pa., assignor of one-half to James Christian, Germantown, Pa.

Application February 29, 1932. Serial No. 595,944

2 Claims. (Cl. 224—29)

The invention relates to luggage carriers and more especially to collapsible or foldable luggage carriers for use on automobiles or other vehicles.

The primary object of the invention is the provision of a carrier of this character, wherein it is readily foldable or collapsible when not in use and can be conveniently detachably clamped upon the running board of an automobile or other vehicle so that when in folded position it will constitute a tread to such board and may be conveniently extended for partial capacity or full capacity for accommodating luggage, the carrier in its entirety being of novel construction.

Another object of the invention is the provision of a carrier of this character, wherein the folding parts thereof are such as to economize occupancy of space and in their folded condition will be compact so as not to obstruct the use of the running board of an automobile or other vehicle at that side supporting the carrier as the latter when in folded condition constitutes a tread, the clamps of the carrier for the mounting thereof upon the running board being of simplified kind to permit the mounting and demounting of the carrier with dispatch and such carrier when in folded condition will be latched to prevent unfolding thereof.

A further object of the invention is the provision of a carrier wherein a tarpaulin is associated therewith so that luggage can be wrapped to protect the same from weather elements when within the carrier, the tarpaulin being of novel form and likewise attached to the carrier in a novel way.

A still further object of the invention is the provision of a carrier of this character which is simple in construction, thoroughly reliable and efficient in its purpose, strong yet light in weight, compact, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:—

Figure 2 is a vertical transverse sectional view through the luggage carrier showing the same in collapsed or folded condition.

Figure 3 is a sectional view on the line 3—3 of Figure 1 looking in the direction of the arrows.

Figure 4 is a sectional view on the line 4—4 of Figure 3 looking in the direction of the arrows.

Figure 5 is a sectional view on the line 5—5 of Figure 4 looking in the direction of the arrows.

Similar reference characters indicate corresponding parts throughout the several views in the drawings.

Figure 1:
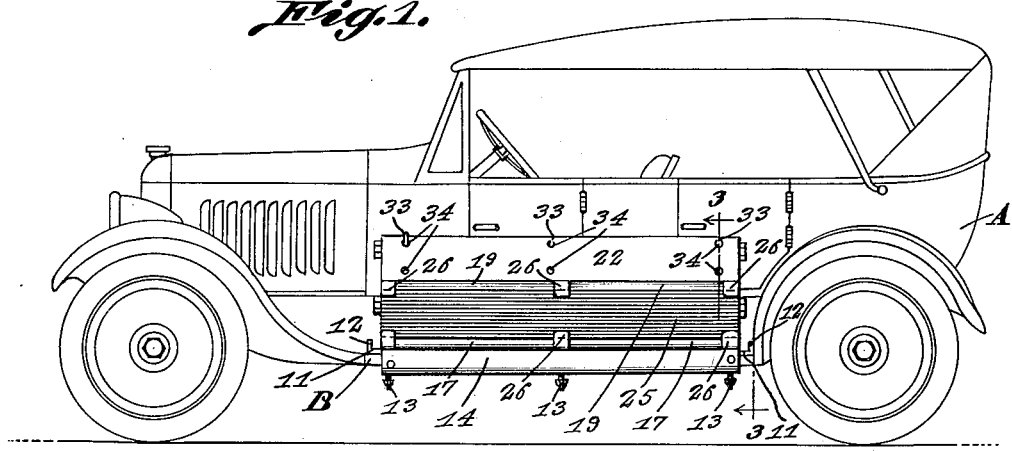
Figure 1 is a side elevation of an automobile showing the luggage carrier constructed in accordance with the invention applied thereto and in set up condition for the carriage of luggage.
Figure 6:
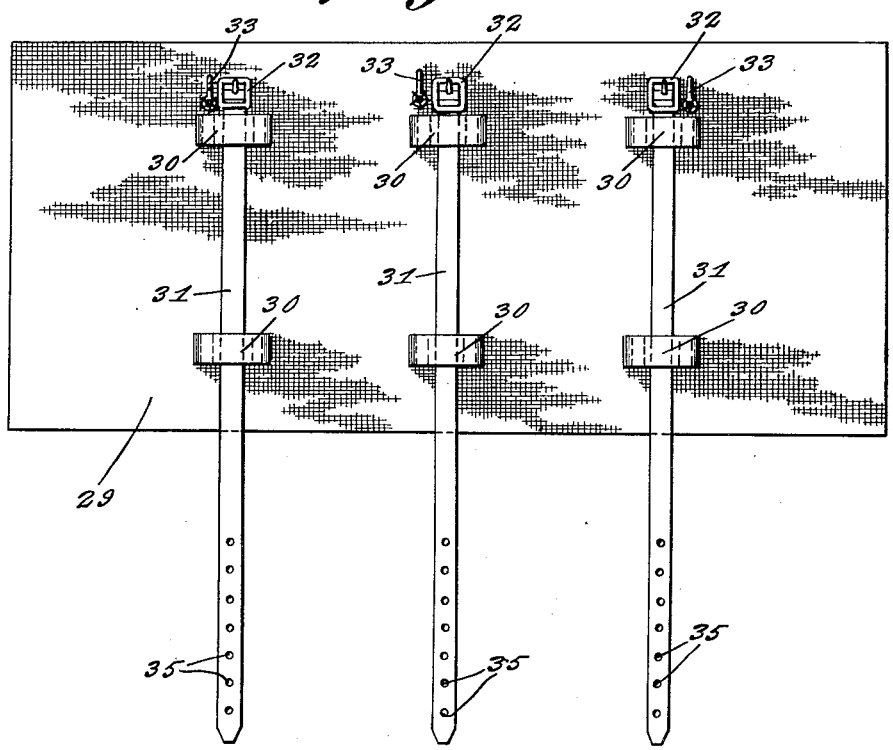
Figure 6 is a detail plan view of the tarpaulin associated with the luggage carrier.

Referring to the drawings in detail, A designates generally an automobile of any standard type having the usual side running board B constituting a permanent part of the said automobile and to this running board is applicable the luggage carrier constituting the present invention and hereinafter fully described.

The luggage carrier comprises intermediate and outer running board clamps 10 and 11, the latter being formed with upstanding side flanges 12 and these clamps constitute jaws for the reception of the running board therein and are provided with clamping screws 13 threaded in the jaws for the firm and secure clamping thereof to the running board B.

The clamps 10 and 11 are riveted or otherwise made fast in their set relation to each other to a section 14 constituted by a metallic strip, the latter being of the required length and depth to confront the outer edge of the running board B while at the upper edge of this section 14 are pintle sleeves 15 for accommodating a pintle 16, the latter being also engaged in pintle sleeves 17 formed at the lower edge of a foldable section 18 which is hinged to the section 14 in this manner. This section 18 is formed with pintle sleeves 19 accommodating a pintle 20, the latter also engaging pintle sleeves 21 formed at the lower edge of a foldable section 22, the sections 18 and 22 constituting the guards or fence of the luggage carrier.

The sections 18 and 22 each at opposite ends have hinged thereto foldable end guards 23, these carrying at their free outer ends buffers or bumper tips 24 so that when the said guards 23 are swung at right angles to the sections 18 and 22 on shifting the latter to perpendicular position the tips 24 will contact with the body of the automobile and the latter will be protected from being marred or damaged by rubbing action of such guards 23 thereagainst. The guards 23 are folded inwardly against the sections 18 and 22 when the latter are to be folded inwardly on the collapsing of the luggage carrier when not in use. This folding of the guards 23 and the sections 18 and 22 will bring the same to the position as is clearly shown in Figure 2 of the drawings, the section 18 lying against the running board B and the section 22 superposed relative to the section 18 with the guards 23 folded therebetween.

The outer face of the section 18 has thereon a mat 25 of rubber or a composition and constitutes a tread piece, the mat being held by the clips 26 cut and bent from the section 18, these clips being extended to function as stops for limiting the outward swinging movement of the sections 18 and 22 and thus maintain such sections in perpendicular or vertical position on the setting up of the luggage carrier for use.

The intermediate clamp 10 carries a spring tensioned manually releasable latch 27 which functions to latch with the section 18 when folded to maintain the luggage carrier in collapsed or folded condition upon the running board B of the automobile A as is clearly shown in Figure 2 of the drawings. This latch 27 has formed therewith a bail handle 28 for convenient manual manipulation to release said latch.

Adapted to be associated with the luggage carrier is a tarpaulin in the form of a sheet 29 having stitched or otherwise secured thereto spaced loops 30 on one side of the same and in these loops are engaged straps 31 each carrying at one end a buckle 32, while adjacent to the buckle carrying ends of the straps 31 and secured to the sheet 29 are hooks 33, these being adapted for detachable engagement in holes 34 formed in the section 22 adjacent to its under free edge and in this fashion the tarpaulin can be detachably joined with the luggage carrier, the tarpaulin being adapted to bag luggage or other articles when to be carried in the luggage carrier, the straps 31 fastening the tarpaulin about the luggage or articles for encasing the same and thus protect the same from weather elements in the carriage thereof by the luggage carrier. When the luggage carrier is collapsed or folded the tarpaulin is detached and may be stored within the automobile A at any convenient locality therein. The straps are provided with buckle engaging holes 35 so that such straps may be adjustably secured externally about the tarpaulin when wrapped about and encasing luggage or other articles.

From the foregoing it is thought that the construction and manner of use of the luggage carrier will be clearly understood and therefore a more extended explanation has been omitted.

What is claimed is:—

1. A luggage carrier of the kind described comprising a pair of outer members substantially L-shaped in section and an intermediate flat member, each member having clamping means for embracing an automobile running board, a metallic strip joined with said members and disposed at the outer edge of the running board, a two-part foldable section hinged to said strip, means formed as parts of said foldable section to hold the same from extending outward beyond vertical alignment with each other on the unfolding of said sections to bring the same in upstanding relation to the strip, end guards hinged to the said foldable sections and having bumper tips for contact with a body of the automobile when the sections are upstanding relative to the strip, and a manually releasable spring tensioned latch carried by the intermediate flat member to hold the foldable sections against the outer members when said section is in folded condition.

2. A luggage carrier of the kind described comprising a pair of outer members substantially L-shaped in section and an intermediate flat member, each member having clamping means for embracing an automobile running board, a metallic strip joined with said members and disposed at the outer edge of the running board, a two-part foldable section hinged to said strip, means formed as parts of said foldable section to hold the same from extending outward beyond vertical alignment with each other on the unfolding of said sections to bring the same in upstanding relation to the strip, end guards hinged to the said foldable sections and having bumper tips for contact with a body of the automobile when the sections are upstanding relative to the strip, a manually releasable spring tensioned latch carried by the intermediate flat member to hold the foldable sections against the outer members when said section is in folded condition, and buckle carrying straps slidably fitted with the foldable sections.

GERSHOM E. THOMAS.